(12) United States Patent (10) Patent No.: US 10,140,770 B2
Sisbot (45) Date of Patent: Nov. 27, 2018

(54) THREE DIMENSIONAL HEADS-UP DISPLAY UNIT INCLUDING VISUAL CONTEXT FOR VOICE COMMANDS

(71) Applicant: TOYOTA JIDOSHA KABUSHIKI KAISHA, Toyota-shi, Aichi-ken (JP)

(72) Inventor: Emrah Akin Sisbot, Mountain View, CA (US)

(*) Notice: Subject to any disclaimer, the term of this patent is extended or adjusted under 35 U.S.C. 154(b) by 14 days.

(21) Appl. No.: 15/080,394

(22) Filed: Mar. 24, 2016

(65) Prior Publication Data

US 2017/0278305 A1   Sep. 28, 2017

(51) Int. Cl.
*G06T 19/00* (2011.01)
*G06F 3/16* (2006.01)
(Continued)

(52) U.S. Cl.
CPC ............ *G06T 19/006* (2013.01); *B60K 35/00* (2013.01); *G02B 27/0101* (2013.01); *G06F 3/167* (2013.01); *H04N 7/188* (2013.01); *B60K 2350/1076* (2013.01); *B60K 2350/2017* (2013.01); *G02B 2027/0138* (2013.01)

(58) Field of Classification Search
CPC ........ G06T 19/006; G06T 2207/30264; G01C 21/365; G01C 21/3679–21/3685; G01C 21/3691; G01C 21/3694; G06K 9/00812; G06K 9/00818
See application file for complete search history.

(56) References Cited

U.S. PATENT DOCUMENTS 8,521,411 B2    8/2013  Grabowski et al.
9,317,895 B1*   4/2016  Tidwell .................. G06T 3/005
(Continued)

FOREIGN PATENT DOCUMENTS

DE   102013003059 A1   8/2014
JP   2003-329477 A    11/2003
(Continued)

OTHER PUBLICATIONS

Lowensohn, "This tiny projector puts smartphone apps on your car's windshield," http://bit.ly/1L0QZ0p, The Verge, downloaded on Mar. 25, 2016, pp. 1-9.

*Primary Examiner* — Daniel F Hajnik
(74) *Attorney, Agent, or Firm* — Burbage Law, P.C.; Jon-Michael Burbage; Elizabeth Ruzich

(57) ABSTRACT

The disclosure includes a system and method for wireless data sharing between a mobile client device and a three-dimensional heads-up display unit. A system may include a three-dimensional heads-up display unit ("3D HUD") installed in a vehicle. The system may include a memory storing instructions that, when executed, cause the system to: establish a peer-to-peer video stream between a mobile client device and the vehicle; generate live video data for providing a video stream for causing a screen of the mobile client device to display visual content of the 3D HUD that includes substantially live images depicting what the driver of the vehicle sees when looking at the 3D HUD; and stream the live video data to the mobile client device to cause the screen of the mobile client device to display the video stream that depicts what the driver of the vehicle sees when looking at the 3D HUD.

21 Claims, 9 Drawing Sheets

(51) Int. Cl.
   *B60K 35/00* (2006.01)
   *G02B 27/01* (2006.01)
   *H04N 7/18* (2006.01)

(56) References Cited

U.S. PATENT DOCUMENTS

| | | | | |
|---|---|---|---|---|
| 2003/0009281 A1* | 1/2003 | Whitham | ............ | G01C 21/343 |
| | | | | 701/468 |
| 2003/0083807 A1* | 5/2003 | Kuroda | ............... | G01C 21/362 |
| | | | | 701/468 |
| 2003/0216862 A1 | 11/2003 | Kawazoe et al. | | |
| 2006/0103590 A1 | 5/2006 | Divon | | |
| 2008/0307356 A1* | 12/2008 | Kawauchi | ......... | G01C 21/3611 |
| | | | | 715/810 |
| 2010/0023257 A1* | 1/2010 | Machino | ............... | G01C 21/34 |
| | | | | 701/533 |
| 2012/0245945 A1 | 9/2012 | Miyauchi et al. | | |
| 2013/0010103 A1* | 1/2013 | Ihara | ........................ | G08G 1/04 |
| | | | | 348/116 |
| 2014/0111647 A1* | 4/2014 | Atsmon | ............... | H04N 7/185 |
| | | | | 348/148 |
| 2014/0132767 A1* | 5/2014 | Sonnabend | ........... | G08G 1/144 |
| | | | | 348/148 |
| 2014/0303839 A1* | 10/2014 | Filev | ..................... | G06F 3/0481 |
| | | | | 701/36 |
| 2014/0310075 A1* | 10/2014 | Ricci | ..................... | H04W 48/04 |
| | | | | 705/13 |
| 2014/0362195 A1* | 12/2014 | Ng-Thow-Hing | ......................... | |
| | | | | G06K 9/00791 |
| | | | | 348/51 |
| 2015/0379360 A1* | 12/2015 | Rhee | .................. | G01C 21/3644 |
| | | | | 345/633 |
| 2016/0240012 A1* | 8/2016 | Gruenler | ............... | G06T 19/006 |
| 2016/0284217 A1* | 9/2016 | Lee | ........................ | G08G 1/143 |
| 2017/0001650 A1* | 1/2017 | Park | ..................... | B60W 50/08 |
| 2017/0017851 A1* | 1/2017 | Matsui | .................. | G01C 21/36 |
| 2017/0047064 A1* | 2/2017 | Kirihara | .................... | G06F 3/16 |
| 2017/0168774 A1 | 6/2017 | Sugita et al. | | |

FOREIGN PATENT DOCUMENTS

| | | |
|---|---|---|
| JP | 2006-154476 A | 6/2006 |
| JP | 2007-269309 A | 10/2007 |
| JP | 2012-213132 A | 11/2012 |
| JP | 2015174051 A1 | 12/2015 |
| WO | WO2014196038 A1 | 12/2014 |
| WO | WO2016002406 A1 | 1/2016 |

* cited by examiner

THREE DIMENSIONAL HEADS-UP DISPLAY UNIT INCLUDING VISUAL CONTEXT FOR VOICE COMMANDS

BACKGROUND

The specification relates to three dimensional ("3D") overlays for a three dimensional heads-up display unit ("3D HUD") of a vehicle. The 3D overlays may provide visual context for voice commands associated with a voice-enabled system.

Vehicles may be equipped with a heads-up display unit ("HUD"). Vehicles may include a voice command system. For example, a navigation system of a vehicle may be operable by a voice command system so that if a driver of the vehicle says "Give me directions to the gas station" the navigation system retrieves navigation directions from the current location of the vehicle to the nearest gas station. Other vehicle systems may be operable by the voice command system.

SUMMARY

Described are implementations that may include a system and method for using a 3D HUD of a vehicle to provide visual context for voice commands that are available to a driver of the vehicle.

A visual context application described herein provides one or more 3D overlays for objects that the driver sees when looking through the 3D HUD. For example, the driver is looking through the 3D HUD of the vehicle and sees a sign for a business and a parking space. The driver also sees a 3D overlay displayed near the sign for the business that indicates that the driver can provide a voice command to a voice command system of the vehicle to request more information about the business (e.g., "What are the business hours?" or "What products or services does the business sell?"). Also displayed in the 3D HUD is a 3D overlay near the parking space indicating that the driver can provide a voice command to cause the vehicle to automatically park in the parking space.

A 3D overlay may include a three dimensional (herein "3D") graphical image displayed by the 3D HUD. Accordingly, each 3D overlay described herein may be displayed in 3D by the 3D HUD.

The objects viewable through the 3D HUD may be included in images captured by a camera mounted to the vehicle. The camera may be configured to capture images of the vehicle environment. The vehicle environment may include the environment where the vehicle is located. The objects in the vehicle environment may include, for example, one or more of the following: a destination (see, e.g., FIGS. 3 and 5); a parking space (see, e.g., FIG. 4); a parking sign (see, e.g., FIG. 4); another vehicle that is being followed (see, e.g., FIG. 6); and any other object in the vehicle environment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method including: capturing an image of an object in a vehicle environment, where the image includes a scene in the vehicle environment that is viewable by a driver when looking through a through a 3D HUD included in a vehicle that is driven by the driver; receiving GPS data describing a geographic location of the vehicle; receiving directory data describing one or more destinations proximate to the geographic location of the vehicle and operation information for the one or more destinations; determining an identity of the object based at least in part on a set of object priors including images of the one or more destinations; determining time data describing a current time; determining a relevance of the object to the driver based on the time data and the operation information; selecting a voice command that is relevant to the object and the driver based on one or more of the identity of the object and the relevance of the object to the driver; identifying three dimensional overlay data (3D overlay data) associated with the object based on the on one or more of the relevance of the object to the driver and the voice command; and painting a 3D overlay described by the 3D overlay data at a first location in the 3D HUD that is proximate to a second location of the object in the 3D HUD as viewed by the driver. Other embodiments of this aspect include corresponding computer systems, apparatus, and computer programs recorded on one or more computer storage devices, each configured to perform the actions of the methods.

One general aspect includes a computer-implemented method including: capturing an image of an object in a vehicle environment, where the image includes a scene in the vehicle environment that is viewable by a driver when looking through a through a 3D HUD included in a vehicle that is driven by the driver; receiving GPS data describing a geographic location of the vehicle; receiving directory data describing one or more destinations proximate to the geographic location of the vehicle and operation information for the one or more destinations; determining an identity of the object; selecting a voice command that is relevant to the object based on the identity of the object; identifying 3D overlay data associated with the object based on the voice command; and painting a 3D overlay described by the 3D overlay data at a first location in the 3D HUD that is proximate to a second location of the object in the 3D HUD as viewed by the driver, where the 3D overlay describes the voice command that is available to the driver. Other embodiments of this aspect include corresponding computer systems, apparatus, and computer programs recorded on one or more computer storage devices, each configured to perform the actions of the methods.

Implementations may include one or more of the following features. The method where the identity of the object is determined based at least in part on a set of object priors including images of the one or more destinations. The method further including determining time data describing a current time. The method where the object is a business and the operation information describes hours of operation for the business. The method where the operation information and the time data indicates that the destination is not available at the current time. The method where the selected voice command includes requesting information about the business and the 3D overlay includes a graphic indicating that the driver may request information about the business. The method where the operation information and the time data indicates that the destination is available at the current time. The method where the selected voice command includes calling the business and the 3D overlay includes a graphic indicating that the driver may request that a phone call be made to the business. The method where the selected voice command includes requesting information about the business and the 3D overlay includes a graphic indicating that the driver may request information about the business. The method further including determining weather data describing a weather forecast for the geographic location. The method where the object is an outdoor facility. The method where the weather forecast indicates weather that is consistent with the operation information for the outdoor facility. The method where the selected voice command includes requesting information about the outdoor facility and the 3D overlay includes a graphic indicating that the driver may request information about the outdoor facility. The method where the weather forecast indicates weather that is consistent with the operation information. The method where the selected voice command includes requesting the weather forecast and the 3D overlay includes a graphic indicating that the driver may request the weather forecast. The method where the outdoor facility is a park. The method where the operation information describes one or more rules for the park, the selected voice command includes requesting the rules for the park and the 3D overlay includes a graphic indicating that the driver may request the rules for the park. The method further including determining a present time, where applicability of the rule varies based on the present time and determining whether the vehicle can legally park in the parking space includes determining whether the rule applies based on the present time. Implementations of the described techniques may include hardware, a method or process, or computer software on a computer-accessible medium. The method where object is a parking space, the selected voice command includes requesting the vehicle automatically park in the parking space and the 3D overlay includes a graphic indicating that the driver may request that the vehicle automatically park in the parking space.

One general aspect includes a computer-implemented method including: capturing an image of a parking space and a parking sign associated with the parking space, where the parking space is viewable by a driver when looking through a through a 3D HUD included in a vehicle that is driven by the driver; determining an identity of the parking sign based at least in part on a set of object priors including images a set of parking signs; determining a rule associated with the parking sign based on the identity of the parking sign; determining whether the vehicle can legally park in the parking space based on the rule; determining 3D overlay data describing whether the vehicle can legally park in the parking space; and painting a 3D overlay described by the 3D overlay data at a first location in the 3D HUD that is proximate to a second location of the parking space in the 3D HUD as viewed by the driver. Other embodiments of this aspect include corresponding computer systems, apparatus, and computer programs recorded on one or more computer storage devices, each configured to perform the actions of the methods.

Implementations may include one or more of the following features. The method further including determining a present time, where applicability of the rule varies based on the present time and determining whether the vehicle can legally park in the parking space includes determining whether the rule applies based on the present time. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
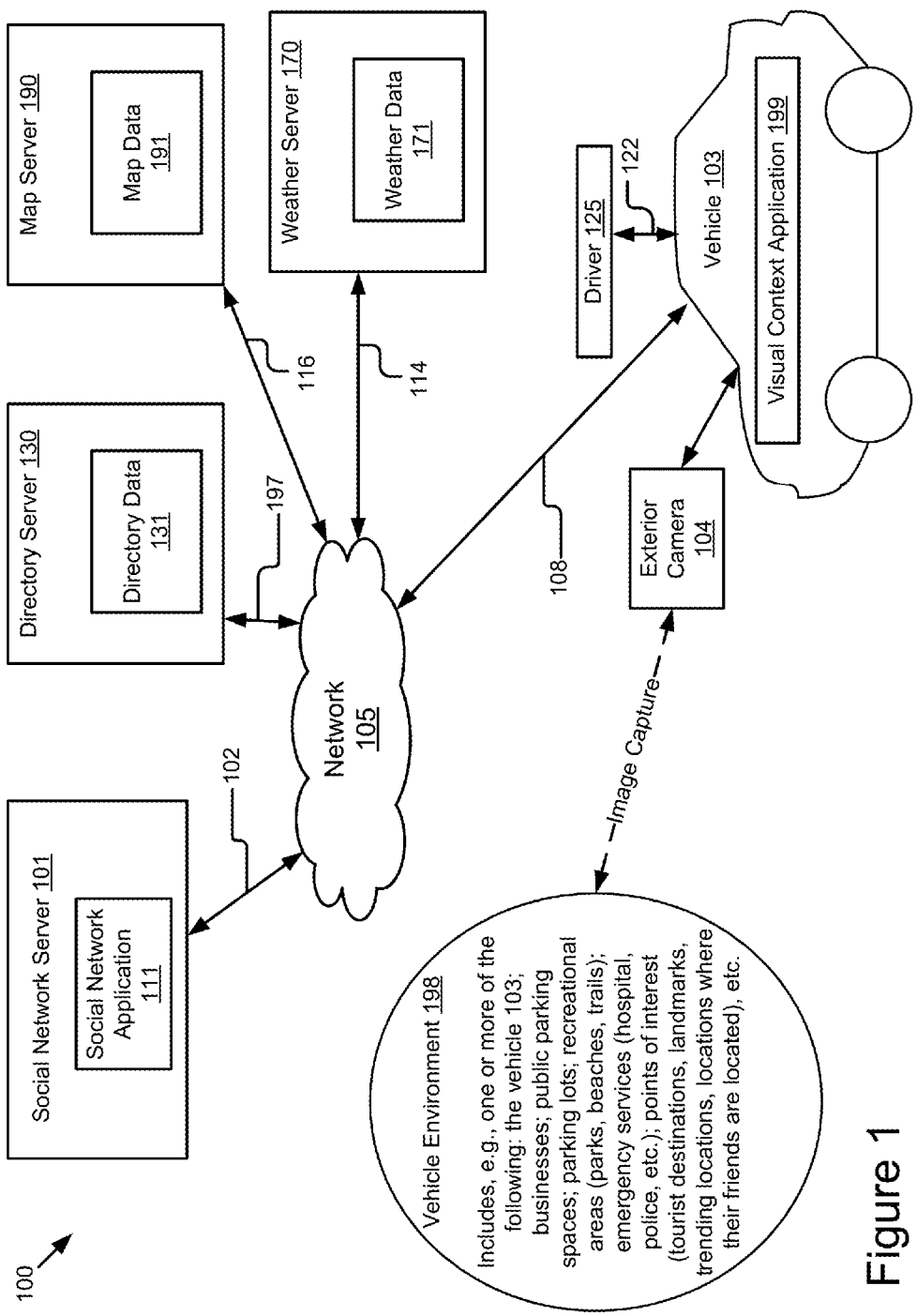
FIG. 1 is a block diagram illustrating an example operating environment for a visual context application according to some implementations.

Vehicles may be equipped with a heads-up display unit ("HUD"). Vehicles may include a voice command system. For example, a navigation system of the vehicle may be operable by a voice command system so that if a driver of the vehicle says "Give me directions to the gas station" the navigation system retrieves navigation directions from the current location of the vehicle to the nearest gas station. The navigation directions may be spoken to the driver through the audio system of the vehicle or displayed on a head unit of the vehicle.

Other vehicle systems may be operable by the voice command system. For example, one or more of the following vehicle systems may be operable by the voice command system: an infotainment system; a browser of an infotainment system; an electronic personal assistant; a call function for placing voice calls; an automated parking system; etc.

The visual context application described herein displays visual context in a 3D HUD (see, e.g., FIG. 2B) of a vehicle for the voice commands that are available to a driver of the vehicle. The visual context application beneficially improves the usability of the voice command system since drivers will know what voice commands are available to them without having to cycle through a long list of available commands listed in a head unit of the vehicle. Using the 3D HUD to provide the visual context removes the possible ambiguity caused by having multiple possible targets for a given command.

There are no current technologies that provide the functionality provided by the visual context application described herein.

First, there are no existing technologies that use a 3D HUD to provide visual context for voice commands.

Second, the visual context application beneficially edits the list of voice commands available to the driver based on their vehicle environment, and then displays the edited list for the driver to see on the 3D HUD. There are no other solutions that detect the environment of the vehicle and edit the list of available commands so that the driver only sees the voice commands that are relevant to them based on their current vehicle environment.

Third, the visual context application displays the available voice commands on the 3D HUD as 3D overlays that are located (within the 3D HUD) near an object that is related to 3D overlay. For example, if one of the voice commands is related to getting information about a business, then the graphical overlay for this voice command might say "Get info?" and be located near a sign for that business as displayed in the 3D HUD. There might be multiple businesses close to each other where the command "Get Info?" may be used. See, for example, FIG. 3. Usage of the 3D HUD in this manner removes any ambiguity caused by the overlay since the 3D HUD includes technology that places the visual cue at the right distance from the driver. No other technology uses a 3D HUD to provide visual indication (e.g., a 3D overlay) of available voice commands while also painting the 3D overlay in the screen of the 3D HUD so that it is placed near the object it is related to.

The visual context application described herein may include a system and method for using the 3D HUD of a vehicle to provide visual context for the voice commands that are available to a driver of the vehicle. The visual context may include a 3D overlay that is displayed on the screen of the 3D HUD.

In some implementations, the graphical overlay may be relevant to some object that is viewable by the driver of the vehicle in the screen of the 3D HUD. The object might be a business, parking space, point of interest, public facility (recreational park, hospital, police, etc.), another vehicle on the roadway, or any other object in the vehicle environment.

In some implementations, the visual context application may identify the object and determine how the object is relevant to the driver of the vehicle given the current time, vehicle location and conditions (e.g., If the business is closed, then it is not relevant. If the object is a recreational park but the weather conditions are poor, then the object is not relevant. If the object is a parking space but it is currently illegal for the driver to park in the parking space because of the time of day, then the object is not relevant.).

In some implementations, the visual context application may determine which of the available voice commands are relevant to the object and the driver given the object identity (e.g., if the object is a business, then a voice command for increasing the radio volume is not relevant to the object, whereas a voice command for calling the business or requesting information about the business would be relevant.). This step may be repeated for each of the objects identified as being viewable by the driver in the 3D HUD.

In some implementations, relevancy of an object to the driver may be based on user input provided at an earlier time. The user input may be provided via a web interface, a smartphone application or the head unit of vehicle. The driver may be able to provide voice input to the system to train the system about which object/voice command pairs are relevant to the driver.

In some implementations, the visual context application may determine a graphic for displaying near the object in the 3D HUD. The graphic may describe which voice commands are available for the particular object. The graphic may be a graphical overlay or a 3D overlay that is designed with subtle qualities so that it is non-distracting for the driver. The graphic may also be transparent so that the driver can still see the road and traffic behind the graphic.

In some implementations, the visual context application may paint the graphic on the 3D HUD in proximity to the object so that the driver knows which voice commands are available for the object. If there are multiple objects that are relevant, the system places visual graphics at the right distance to the driver.

In some implementations, the visual context application may proactively determine if the graphic will be distracting to the driver or cause a safety risk and selectively not paint certain graphics that are determined to pose a safety risk. For example, if two graphics are to be painted, but one graphic will obscure the driver's view of oncoming traffic but the other graphic will not, then my invention will only paint the graphic that does not obscure the driver's view of traffic.

In some implementations, the visual context application may listen for the driver to provide a voice command. If a voice command is given, the visual context application may take action based on the voice command.

A vehicle environment may include the area around a vehicle. The vehicle environment may include one or more of the following: the vehicle itself; other vehicles; one or more businesses; one or more public parking spaces; one or more parking lots; one or more recreational areas (parks, beaches, trails); one or more emergency services (hospital, police, etc.); one or more points of interest (tourist destinations, landmarks, trending locations, locations where their friends are located), etc.

The vehicle may include an exterior camera mounted to the vehicle to capture images of scenes present in the vehicle environment. The exterior camera may be communicatively coupled to the visual context application. The visual context application may be operable to control the operation of the exterior camera.

In some implementations, the visual context application may operate the camera to cause the camera to capture one or more images of objects in the vehicle environment. The images may include scenes in the vehicle environment that are viewable by the driver via the 3D HUD at the present time.

The vehicle may include a global positioning system ("GPS") unit. The visual context application may be communicative coupled to the GPS unit. The visual context application may be operable to control the operation of the GPS unit.

In some implementations, the visual context application may determine GPS coordinates for the vehicle.

The vehicle may include a communication unit. The communication unit may be communicatively coupled to a network. The communication unit may retrieve or otherwise receive data from one or more services via the network. The services may include a social network service, a directory service, a map service and a weather service. The social network service may provide one or more social networks. The directory service may provide data describing one or more destinations (e.g., businesses, recreational areas, points of interest, landmarks, etc.). The weather service may provide information describing the present weather or a weather forecast.

In some implementations, the visual context application may retrieve directory data for one or more businesses, parks, beaches and points of interest near the geographic area indicated by the GPS coordinates.

In some implementations, the visual context application may analyze the one or more images to identify the objects present in the images. The visual context may use object priors to identify destinations (e.g., candidate businesses, parking spaces and other objects) included in the images. The directory data may then be used to further identify the name of the destination.

In some implementations, the visual context application may retrieve weather data for the geographic area indicated by the GPS coordinates.

In some implementations, the visual context application may retrieve social data for the driver.

In some implementations, the visual context application may determine time data describing the current time of day and the day of week.

In some implementations, for each identified object included in the images, the visual context application may determine how the object is relevant to the driver given one or more of the following: the current time; the current day; the vehicle location; and other conditions (weather conditions, social media conditions, etc.). For example, if the object is a business that is closed, then the object is not relevant. If the object is a recreational park but the weather conditions are poor, then the object is not relevant. If the object is a parking space but it is currently illegal for the driver to park in the parking space because of the time of day, then the object is not relevant.

The vehicle may include a voice command system. The voice command system may include a set of voice commands. The voice command system may be operable to control one or more vehicle functions based on receipt of a voice command. For example, if the driver says "park in the parking space," then the voice command system may be operable to cause automated parking system of the vehicle to park in the target parking space.

In above example, the voice command was relevant to the target of the voice command (i.e., the target of the voice command is the parking space). However, the voice command system includes other voice commands that are not relevant to the target. For example, the voice command system may include a voice command such as "turn up the volume of the radio" that is not relevant to a target that includes a parking space.

In some implementations, the visual context application may determine which of the available voice commands are relevant to the identified object in the image and the driver given the object identity (e.g., If the object is a business, then a voice command for increasing the radio volume is not relevant to the object. However, a voice command for calling the business is relevant. Another relevant voice command would be requesting information about the business.). This step may be repeated for each of the objects identified as being viewable in the 3D HUD.

In some implementations, the visual context application may determine a graphic for displaying near the object in the 3D HUD.

In some implementations, the visual context application may paint the graphic on the 3D HUD in proximity to the object by transforming the sensor coordinates of the object to driver's point of view coordinates so that the driver knows which voice commands are available for the object.

In some implementations, for closed business, the visual context application may paint a graphic on the 3D HUD informing the driver of the business name and hours of operation indicating that the business is closed.

In some implementations, the visual context application may proactively determine if the graphic will be distracting to the user or cause a safety risk and selectively not paint certain graphics if they will cause a safety risk. For example, if two graphics are to be painted, but one graphic will obscure the driver's view of oncoming traffic but the other graphic will not, then paint the graphic that does not obscure the driver's view of traffic.

In some implementations, the visual context application may listen for the driver to provide a voice command. If a voice command is given, the visual context application take action based on the voice command. For example, the visual context application may be operable to cause the voice command system to take action that fulfills the voice command.

In addition to voice commands, the visual context application may be operation to work with other types of commands such as a driver pressing the buttons on the steering wheel or the infotainment system of the vehicle.

System Overview

FIG. 1 is a block diagram illustrating an example operating environment 100 for a visual context application 199 according to some implementations.

The operating environment 100 includes a vehicle 103, a social network server 101, a directory server 130, a map server 190, weather server 170 and a vehicle environment 198. The vehicle 103 can be accessed by a driver 125 via signal line 122. In the illustrated implementation, these entities of the operating environment 100 may be communicatively coupled via a network 105. The operating environment 100 may include other servers or devices not shown in FIG. 1 including, for example, a traffic server for providing traffic data, a content server for providing infotainment content, a Voice over Internet Protocol ("VoIP") server for providing VoIP service, a power service server for providing power usage service (e.g., billing service), etc.

The vehicle 103 in FIG. 1 can be used by way of example. While FIG. 1 illustrates one vehicle 103, the disclosure applies to a system architecture having one or more vehicles 103. Furthermore, although FIG. 1 illustrates one network 105 coupled to the vehicle 103, the social network server 101, the directory server 130, the map server 190 and the weather server 170, in practice one or more networks 105 can be connected to these entities. While FIG. 1 includes one social network server 101, one directory server 130, one map server 190 and one weather server 170, the operating environment 100 could include one or more social network servers 101, one or more directory servers 130, one or more map servers 190 and one or more weather servers 170.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a GPS satellite for providing GPS navigation to the vehicle 103. The network 105 may be a mobile data network such as 3G, 4G, LTE, Voice-over-LTE ("VoLTE"), Dedicated Short Range Communication ("DSRC"), millimeter wave communication ("mmWave communication"), or any other mobile data network or combination of mobile data networks.

In some implementations, the operating environment 100 may include a GPS satellite for providing GPS location data to the vehicle 103 that describes the geographic location of the vehicle 103. The GPS location data may include GPS coordinates of the vehicle 103. This data may be stored as the GPS data 295 described below with reference to FIG. 2A.

In some implementations, the vehicle 103 is equipped with a DSRC-compliant GPS unit that is operable to provide GPS data that describes the location of the vehicle 103 to a lane-level degree of precision. The DSRC standard requires that GPS data be precise enough to identify which lane a vehicle is traveling in. The DSRC-compliant GPS unit may be operable to identify, monitor and track its two-dimensional position within 1.5 meters (i.e., "1 sigma") of the time. In other words, when comparing the actual position of the vehicle 103 to the position described by the GPS data generated by the DSRC-compliant GPS unit, there is at least a 68% chance that the position described by the GPS data is within 1.5 meters (i.e., <1.5 meters) of the actual position of the vehicle 103 when the GPS sensor of the vehicle 103 is under an open sky. Since lanes and vehicles are typically less than 3 meters wide, whenever the 2D error of the GPS data is <1.5 meters the vehicle 103 described herein may analyze the GPS data and know a location of the vehicle 103 that is accurate to within 1.5 meters.

In some implementations, a visual context application 199 can be operable on the vehicle 103. The vehicle 103 can be a mobile client device with a battery system. For example, the vehicle 103 can be one of an automobile, a truck, a car, a bus, a semi-truck, a sports utility vehicle, an autonomous vehicle, a semi-autonomous vehicle, a drone, a bionic implant, or any other mobile system including non-transitory computer electronics and a battery system. In some implementations, the vehicle 103 may include a computing device that includes a memory and a processor. In the illustrated implementation, the vehicle 103 is communicatively coupled to the network 105 via signal line 108.

In some implementations, the vehicle 103 may include one or more sensors (e.g., the sensor set 233 depicted in FIG. 2A), such as a navigation sensor (e.g., a global positioning system (GPS) sensor), an infrared detector, a camera, a motion detector, a thermostat, a sound detector, one or more cameras, and any other type of sensors. For example, the vehicle 103 may include sensors for measuring one or more of a current time, a location (e.g., a latitude, longitude, and altitude of a location), an acceleration of a vehicle, a velocity of a vehicle, a fuel tank level, and a battery level of a vehicle, etc. The sensors may capture images of an object viewable by the driver 125 through the 3D HUD, the driver 125, the eyes or gaze of the driver 125, a 3D HUD included in the vehicle 103 (e.g., the 3D HUD depicted in FIGS. 2A and 2B). The sensors may include a LIDAR sensor or a range finder configured to determine a distance between the vehicle 103 and the object viewable by the driver 125 through the 3D HUD. The sensors can be used to create or generate sensor data (e.g., sensor data 293 depicted in FIG. 2A) that is stored in a non-transitory memory.

In some implementations, the vehicle 103 may include one or more cameras that are mounted to the vehicle 103 to capture one or more images that depict what the driver 125 sees when looking through (or at) the 3D HUD. For example, the images may depict one or more of the following: (1) the real world that the driver 125 sees when looking through the 3D HUD; and (2) the graphical overlays that the driver 125 sees when looking through the 3D HUD.

In some implementations, the vehicle 103 may include one or more exterior cameras 104. The exterior cameras 104 may include one or more digital cameras. The exterior cameras 104 may capture images of the vehicle environment 198.

The vehicle environment 198 may include the environment that the vehicle 103 where the vehicle 103 is located, whether the vehicle 103 is traveling or stationary. The vehicle environment 198 may be limited to the portions of the outside world which are viewable by the driver 125 or the exterior camera 104. The vehicle environment 198 may include one or more of the following objects: the vehicle 103; other vehicles; one or more businesses; one or more public parking spaces; one or more parking lots; one or more recreational areas (e.g., a park, a beach, a trail head, etc.); one or more points of interests (e.g., a tourist destination, a landmark, a trending location, locations where the driver's friends are located, locations where the driver's friends have checked-in on a social network, etc.). The vehicle environment 198 may also include a roadway and one or more traffic management devices. For example, the vehicle environment 198 may include traffic signs, traffic lights, parking signs, etc. The vehicle environment 198 may include any object that might be located on a roadway or viewable from a roadway.

The exterior camera 104 may capture images of scenes in the vehicle environment. Each scene may include one or objects. The images may be stored as part of the sensor data 293 described below with reference to FIG. 2A. The visual context application 199 may include a set of object priors (e.g., image recognition data 299 described below with reference to FIG. 2A). The object priors may include a set of priors used to identify one or more objects in one or more images. The visual context application 199 may analyze the images to identify objects included in the images based in part on the set of object priors.

The vehicle 103 may include a voice command system and a 3D HUD. The objects depicted in the one or more images are viewable in the 3D HUD. The voice command system may include one or more voice commands that are relevant to the one or more objects. For example, assume the object is a business. The voice command system may include a menu of voice commands. Some of these voice commands may be relevant to the business whereas others are not. For example, a voice command to "turn up the volume" of a radio included in the vehicle is not relevant to the business, but a voice command to "place a phone call" may be relevant to the business since the business may accept phone calls from customers or potential customers.

An example problem with voice command systems is that they include many options for voice commands and the driver 125 may not know what voice commands are available to them. Most voice command systems are configured so that the driver 125 has to listen to a menu of options to learn what voice commands are available to them (or visually cycle through a long menu of options viewable in a display of the vehicle head unit), which may be time consuming, boring and ultimately lead to disuse of the voice command system altogether. A second example problem with voice command systems is that many of the voice commands are not relevant to the driver 125 at any given time. The visual context application 199 solves these problems by displaying 3D overlays on a 3D HUD of the vehicle that depict a set of voice commands that are available to the driver 125 and relevant to the driver 125 or their vehicle environment 198 (see, e.g., FIG. 3).

The visual context application 199 can include software for causing a 3D HUD of the vehicle 103 to display one or more 3D overlays describing, for example, one or more voice commands that are available to a driver 125 of the vehicle 103.

In some implementations, the visual context application 199 may include software for causing the 3D HUD of the vehicle 103 to display one or more of the GUIs depicted in FIGS. 3 through 6.

In some implementations, the visual context application 199 may include code and routines that, when executed by a processor of the vehicle 103 (see, e.g., processor 225 depicted in FIG. 2A), causes the processor to execute one or more steps of the method 700 described below with reference to FIGS. 7A and 7B.

In some implementations, the visual context application 199 may be implemented using hardware including a field-programmable gate array ("FPGA") or an application-specific integrated circuit ("ASIC"). In some other implementations, the visual context application 199 may be implemented using a combination of hardware and software. The visual context application 199 may be stored in a combination of the devices and servers, or in one of the devices or servers.

The visual context application 199 is described in more detail below with reference to FIG. 2A according to some implementations.

The social network server 101 can be a hardware server that includes a processor, a memory, and network communication capabilities. In the illustrated implementation, the social network server 101 is coupled to the network 105 via a signal line 102. The social network server 101 sends and receives data to and from other entities of the operating environment 100 via the network 105.

The social network server 101 includes a social network application 111. A social network can be a type of social structure where the driver 125 and another person may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

In some implementations, the social network application 111 generates a social network that may be used for determining traffic updates. For example, the social network application 111 could be a microblog where people post about accidents on major highways, a forum where people discuss speed traps, a social network where the user has friends that talk about congested surface roads, etc. In some implementations, the visual context application 199 enables the driver 125 to interact or collaborate with one another person inside the social network via an interface of the 3D HUD. For example, the chat session in which the driver 125 and another person collaborate may be provided via the social network application 111.

In some implementations, other people may provide status updates inside the social network, and these status updates may include information about where they are located inside the vehicle environment 198. The visual context application 199 may receive this information from the social network application 111 (with the other person's permission) and provide a 3D overlay for display on the 3D HUD that indicates the location of the other person inside the vehicle environment and provides one or more voice commands that may be used by the driver 125 in relation to the other person. For example, the voice command may include calling the other person.

It is understood that the social network server 101 and the social network application 111 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The directory server 130 can be a hardware server that includes a processor, a memory, and network communication capabilities. In the illustrated implementation, the directory server 130 is coupled to the network 105 via a signal line 197. The directory server 130 sends and receives data to and from other entities of the operating environment 100 via the network 105.

The directory server 130 includes a directory data 131. The directory data 131 describes different destinations and information about the destinations. The information may be referred to herein as "operation information." The destinations may include businesses and different information for these businesses. For example, the directory data 131 may describe the names of the businesses, their hours of operation, the telephone number for the business, the types of products sold by the businesses, any advertisements or promotions available for the business, customer reviews for the businesses, etc. For restaurants, the directory data 131 may describe their menu. For movie theatres, the directory data 131 may describe the movies being shown and the show times for these movies. For fuel stations, the directory data 131 may describe the estimated wait time and the price for different grades of fuel. For hotels, the directory data 131 may describe whether there are vacancies and what the room rates are for the current night. The directory data 131 may also describe relevant information for destinations that are outdoor facilities. For example, the directory data 131 may include information about recreational areas such as the park rules, hours of operation and available activities. The recreational areas may include parks, beaches, trail heads, public golf courses, bike paths, etc. Other examples of directory data 131 are possible.

The directory server 130 may include code and routines that, when executed by the processor of the directory server 130, causes the processor to receive requests for directory data 131 from the visual context application 199 and respond to these requests by transmitting directory data 131 to the visual context application 199 that is responsive to the request. For example, the visual context application 199 may transmit GPS data to the directory server 130. The directory server 130 may retrieve directory data 131 for destinations that are located at the same geographic location, substantially the same geographic location or at a geographic location that with within some predetermined threshold range from the geographic location described by the GPS data received from the visual context application 199.

In some implementations, the directory data 131 transmitted to the visual context application 199 may be configured to so that the visual context application 199 receives directory data 131 for each location viewable by the driver 125 when looking through the 3D HUD of the vehicle 103.

In some implementations, the directory server 130 transmits all the directory data 131 for a geographic region (e.g., for a city, state, or country) to the visual context application 199. The visual context application 199 may then filter the directory data 131 based on GPS data describing the location of the vehicle 103 and map data 191 received from the map server 190.

In some implementations, the directory data 131 may be used by the visual context application 199 to determine whether a destination is relevant to the driver 125 or to select which 3D overlay to display on the 3D HUD of the vehicle 103 for viewing by the driver 125. For example, if the operation information indicates that a business is closed (i.e., not available to the driver 125), then the business may not be relevant to the driver 125 or a different 3D overlay should be selected for displaying to the driver 125. For, if a business is closed then the 3D overlay may describe the hours of operation for the business instead of providing an option to call the business since it does not make sense to call a business that is closed and not available to the driver 125.

The map server 190 can be a hardware server that includes a processor, a memory, and network communication capabilities. In the illustrated embodiment, the map server 190 is coupled to the network 105 via a signal line 116. The map server 190 sends and receives data to and from other entities of the operating environment 100 via the network 105.

The map server 190 may store the map data 191. The map data 191 may describe the maps and geographic locations (or destinations) within a geographic area including the vehicle environment 198. The geographic locations may include the physical addresses for each destination in the geographic area.

The map server 190 may include code and routines that, when executed by the processor of the map server 190, cause the processor to receive requests for map data 191 from the visual context application 199 and transmit map data 191 that is responsive to the request. For example, the visual context application 199 may transmit GPS data describing the geographic location of the vehicle 103 and the map server 190 may select the map data 191 that describes the maps and the geographic locations in the geographic area that includes the vehicle environment 198.

The visual context application 199 may include software that cross references the map data 191 against the directory data 131 to determine which destinations are located in the vehicle environment 198.

For example, the directory data 131 may define the names of each destination and operation information about each destination. The map data 191 may define the names of each destination and the physical address of each destination. The visual context application 199 may cross reference the directory data 131 against the map data 191 to determine the name of each destination within the vehicle environment 198 and the physical address of the destination.

The weather server 170 can be a hardware server that includes a processor, a memory, and network communication capabilities. In the illustrated embodiment, the weather server 170 is coupled to the network 105 via a signal line 114. The weather server 170 sends and receives data to and from other entities of the operating environment 100 via the network 105.

The weather server 170 may store the weather data 171. The weather data 171 may describe a weather forecast for the vehicle environment 198. The weather forecast may describe the present weather conditions for the vehicle environment 198 or the estimated weather conditions for the vehicle environment at some point in the future.

The weather server 170 may include code and routines that, when executed by the processor of the weather server 170, cause the processor to receive requests for weather data 171 from the visual context application 199 and transmit weather data 171 that is responsive to the request. For example, the visual context application 199 may transmit GPS data describing the geographic location of the vehicle 103 and the map server 190 may select the weather data 171 that describes a weather forecast for a geographic area that includes the vehicle environment 198. In some implementations, the weather data 171 may be used by the visual context application 199 to determine whether a destination is relevant to the driver 125 or to select which 3D overlay to display on the 3D HUD of the vehicle 103 for viewing by the driver 125.

Example Systems

Figure 2A:
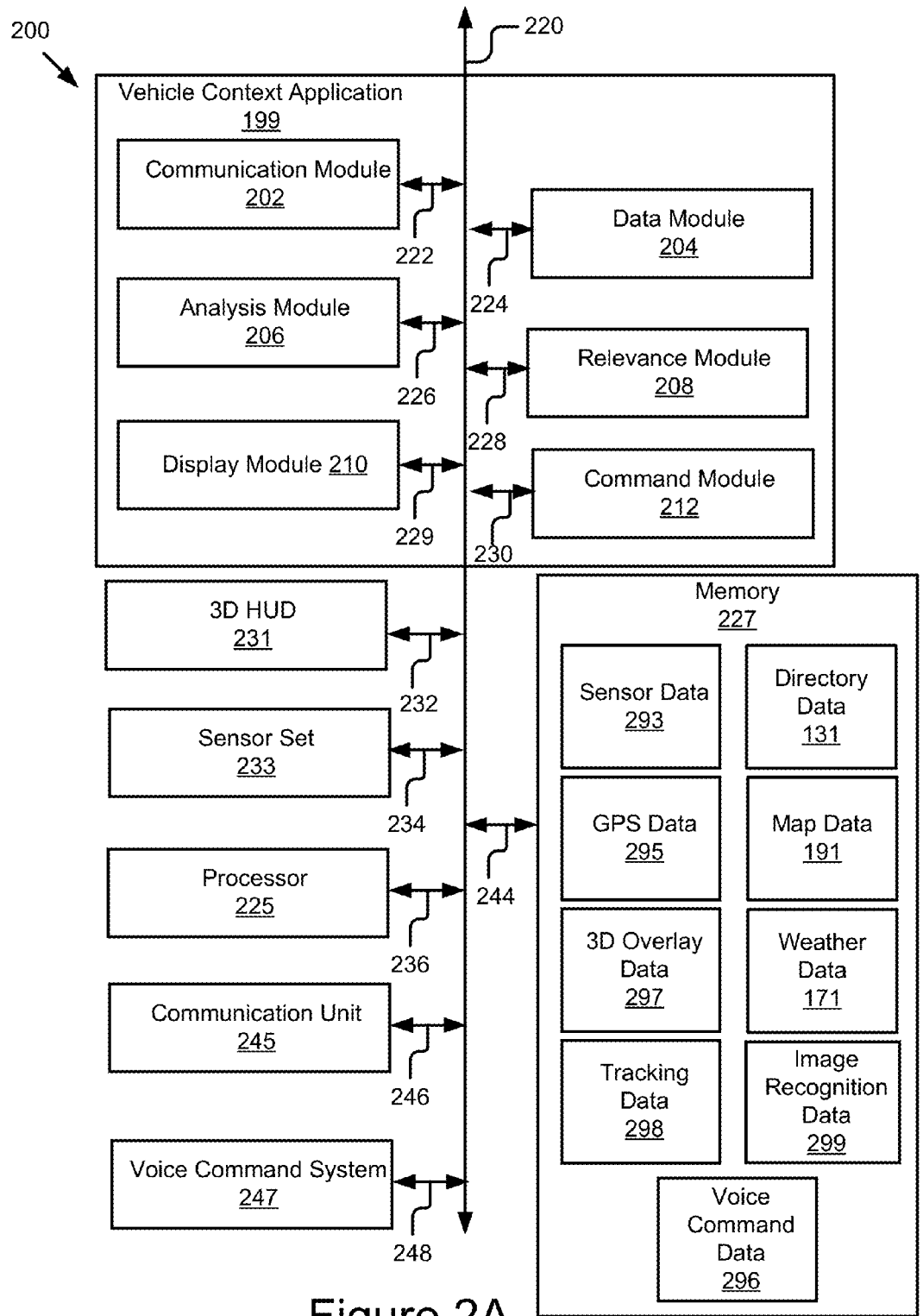
FIG. 2A is a block diagram illustrating an example computer system including a visual context application according to some implementations.

Referring now to FIG. 2A, an example of a computer system 200 including the visual context application 199 is depicted.

FIG. 2A is a block diagram of a computer system 200 that includes the visual context application 199, a processor 225, a memory 227, a 3D HUD 231, a sensor set 233, a communication unit 245 and a voice command system 247 according to some examples. The components of the computer system 200 are communicatively coupled by a bus 220. In some implementations, the computer system 200 can be the vehicle 103.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 236. The processor 225 processes data signals and may include various computing architectures including a complex instruction set computer (CISC) architecture, a reduced instruction set computer (RISC) architecture, or an architecture implementing a combination of instruction sets. The processor 225 may include a graphics processing unit (GPU), an Advanced RISC Machines (ARM) processor or some other processor. Although FIG. 2A includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the memory 227 stores one or more of the following: sensor data 293; GPS data 295; 3D overlay data 297; tracking data 298; image recognition data 299; directory data 131; map data 191; and weather data 171. The following elements of the memory 227 were described above with reference to FIG. 1, and so, these descriptions will not be repeated: the directory data 131; the map data 191; the weather data 171; and voice command data 296. The memory 227 may also store data received from the social network application 111.

The sensor data 293 may include data describing one or more measurements recoded by one or more of the sensors included in the sensor set 233 or images captured by the exterior camera 104. For example, the sensor data 293 includes data describing one or more images captured by the exterior camera 104.

The GPS data 295 may include GPS coordinates for the vehicle 103 received from a GPS satellite that is communicatively coupled to the vehicle 103 via a wireless connection. In some implementations, the computer system 200 includes a GPS unit that receives the GPS data 295 from the GPS satellite. The GPS unit may include a DSRC-compliant GPS unit that is operable to communicate with the GPS satellite to provide GPS data 295 that describes the location of the vehicle 103 to a lane-level degree of precision.

The 3D overlay data 297 may include graphical data describing one or more 3D overlays. The 3D overlay data 297 may be operable to cause the 3D HUD 231 to display the 3D overlay. For example, the 3D overlay data 297 is received by the 3D HUD 231 and the 3D HUD 231 displays the 3D overlay described by the 3D overlay data 297. The 3D overlay described by the 3D overlay data 297 may be animated. Examples of the 3D overlays are depicted in FIGS. 3 through 6.

The voice command data 296 may describe one or more of the voice commands available to the driver 125. The voice commands may include those voice commands that are associated with the functionality provided by the voice command system 247. The voice command data 296 may describe any voice command provided by the voice command system 247.

The 3D overlay data 297 may include information describing where the 3D overlay should be displayed in the 3D HUD 231. For example, the 3D overlay data 297 may include Cartesian coordinates (X, Y, Z) describing where the 3D overlay should be displayed. The Cartesian coordinates may be determined by the display module 210 based on the location of the destination and where the driver 125 sees the destination when looking through the 3D HUD 231 so that the 3D overlay is displayed in an orientation where the driver 125 will perceive the 3D overlay as being proximate to the location of the destination in the 3D HUD 231 as viewed by the driver 125.

In some implementations, the 3D HUD 231 described herein may include 3D superposition display technology along with a 3D HUD 231 follows (or tracks) objects that are viewable in the 3D HUD 231 and have an overlay associated with them; the superposition display technology may position the 3D overlay at a location and refresh the location of the 3D overlay in real-time or substantially real time based on the relative movement of the vehicle 103 and the object associated with the 3D overlay. In some implementations, the display module 210 includes code and routines configured to cause the 3D HUD 231 to display the 3D overlay right at the object as viewed in the 3D HUD 231 by the driver 125 by calculating the correct parallax and focus at the same time. The distance between the vehicle 103 and the object (e.g., as indicated by a LIDAR sensor included in the sensor set 233) may be used by the 3D HUD 231 to display the 3D overlay on the 3D HUD 231.

The tracking data 298 includes information used by the display module 210 to track the location of the object associated with the 3D overlay in the screen of the 3D HUD 231 and modify the location of the 3D overlay so that the 3D overlay tracks the position of the object. The visual context application 199 may receive periodic updates that describe the new location of the object. For example, the sensor set 233 may include a LIDAR sensor or some other range finder that continuously monitors the position of the object and provides sensor data 293 describing the location of the object.

The image recognition data 299 may include data used to perform image recognition of objects as described herein. The image recognition data 299 may include the set of object priors described above for FIG. 1. For example, the object may be the store front of a business. The store front may be depicted in an image captured by the exterior camera 104. The image recognition data 299 may include a set of object priors. The object priors may include images of the store front captured at an earlier time. The analysis module 206 may use the sensor data 293 including the image of the store front and the object prior described by the image recognition data 299 to identify the object as the store front for the particular business (or a generic storefront for a generic business).

The 3D HUD 231 is described in more detail below with reference to FIG. 2B. The 3D HUD 231 may be communicatively coupled to the bus 220 via a signal line 232.

The sensor set 233 was described above with reference to FIG. 1, and so, that description will not be repeated here. The sensor set 233 may include one or more internal or exterior cameras (e.g., exterior camera 104) that are mounted to the vehicle. In some implementations, at least one of the cameras is a digital camera mounted to the interior of the vehicle 103 and configured to monitor the gaze of the driver 125 and determine which region of the 3D HUD 231 the driver 125 is viewing. For example, the interior camera records the first driver's face and, in particular, the first driver's eyes and their gaze relative to the 3D HUD 231.

The sensor set 233 may include an electronic clock or calendar configured to determine the time data describing a present time of day or a present day of the week. The time data may be stored in the sensor data 293.

The sensor set 233 is communicatively coupled to the bus 220 via a signal line 234.

The communication unit 245 transmits and receives data to and from one or more of the elements of the operating environment 100. The communication unit 245 may send and receive data via the network 105 or via direct communicative couplings to the various elements of the operating environment 100. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with one or more elements of the operating environment 100. In some implementations, the communication unit 245 includes a wireless transceiver for exchanging data with the network 105 (or some other element of the operating environment 100) or other communication channels using one or more wireless communication methods, including IEEE 802.11, IEEE 802.16, BLUETOOTH®, DSRC, mmWave communication or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The voice command system 247 includes a voice command device that may be controlled by the human voice of the driver 125. The voice command system 247 is communicatively coupled to the bus 220 via a signal line 248.

The visual context application 199 includes one or more of the following: a communication module 202, a data module 204, an analysis module 206, a relevance module 208, a display module 210 and a command module 212.

The communication module 202 is communicatively coupled to the bus 220 via a signal line 222. The data module 204 is communicatively coupled to the bus 220 via a signal line 224. The analysis module 206 is communicatively coupled to the bus 220 via a signal line 226. The relevance module 208 is communicatively coupled to the bus 220 via a signal line 228. The display module 210 is communicatively coupled to the bus 220 via a signal line 229. The command module 212 is communicatively coupled to the bus 220 via a signal line 230.

The communication module 202 can be software including routines for handling communications between the visual context application 199 and other components of the computer system 200. In some implementations, the communication module 202 can be a set of instructions executable by the processor 225 to provide the functionality described below for handling communications between the visual context application 199 and other components of the computer system 200.

In some implementations, the communication module 202 can be stored in the memory 227 of the computer system 200 and can be accessible and executable by the processor 225.

The communication module 202 receives data and transfers the data, via the communication unit 245, to the other components of the operating environment 100. For example, the communication module 202 receives one of more of the following via the communication unit 245: the directory data 131; map data 191; weather data 171; GPS data 295; and data from the social network application 111.

The communication module 202 receives data and transfers the data to the other components of the computer system 200. For example, the communication module 202 transmits 3D overlay data 297 to the 3D HUD 231.

The communication module 202 can communicate with elements of the vehicle 103.

The data module 204 can be software including routines for causing the processor 225 to perform one or more of the following operations: operating the sensor set 233 to cause the sensor set 233 to capture sensor data 293; operating the exterior camera 104 to cause the exterior camera 104 to capture images of the vehicle environment 198 and storing the images as sensor data 293; causing the GPS-unit of the vehicle 103 to request the GPS data 295 from a GPS satellite, requesting directory data 131 from the directory server 130; requesting map data 191 from the map server 190; requesting weather data 171 from the weather server 170; requesting social network data or social network updates from the social network application 111; and cross referencing map data 191 and directory data 131 as described above for FIG. 1 to determine the destinations present in the vehicle environment 198, the physical addresses of these destinations and where these destinations are located in the screen of the 3D HUD 231 as viewed by the driver 125.

In some implementations, the data module 204 can be stored in the memory 227 of the computer system 200 and can be accessible and executable by the processor 225.

The analysis module 206 can be software including routines for causing the processor 225 to perform one or more of the following operations: analyzing images included in to identify objects present in the images (the object may be a destination (see, e.g., FIGS. 3 and 5), a parking space (see, e.g., FIG. 4), a parking sign (see, e.g., FIG. 4), another vehicle that is being followed (see, e.g., FIG. 6), or any other object in the vehicle environment 198); analyze the directory data 131 for the vehicle environment 198 to determine an identity of the object (e.g., a name of a business and operation information for the business); and analyze the time data to determine a current time of day or a current day of week.

In some implementations, the vehicle 103 is following another vehicle and the analysis module 206 analyzes images of the vehicle environment 198 to determine which vehicle on the roadway, among possibly many vehicles on the roadway and viewable by the driver 125 through the 3D HUD 231, is the vehicle that is being followed. See, e.g., FIG. 6. The analysis module 206 may continue to track the location of the vehicle being followed so that the driver 125 may keep track of the vehicle on the roadway.

In some implementations, the analysis module 206 can be stored in the memory 227 of the computer system 200 and can be accessible and executable by the processor 225.

The relevance module 208 can be software including routines for causing the processor 225 to determine, for each identified object included in the images, how the object is relevant to the driver 125 given one or more of the following: the current time; the current day; the geographic location of the vehicle 103; and other conditions (weather conditions described by the weather data 171, social media conditions described by social media data received from the social network application 111, etc.).

For example, if the object is a business that is closed, then the relevance module 208 may determine that the object is not relevant to the driver 125.

In another example, if the object is a recreational park but the weather data 171 indicates that the weather conditions are poor (or otherwise inconsistent with visiting an outdoor facility such as a park), then the relevance module 208 may determine that the object is not relevant to the driver 125.

Figure 4:
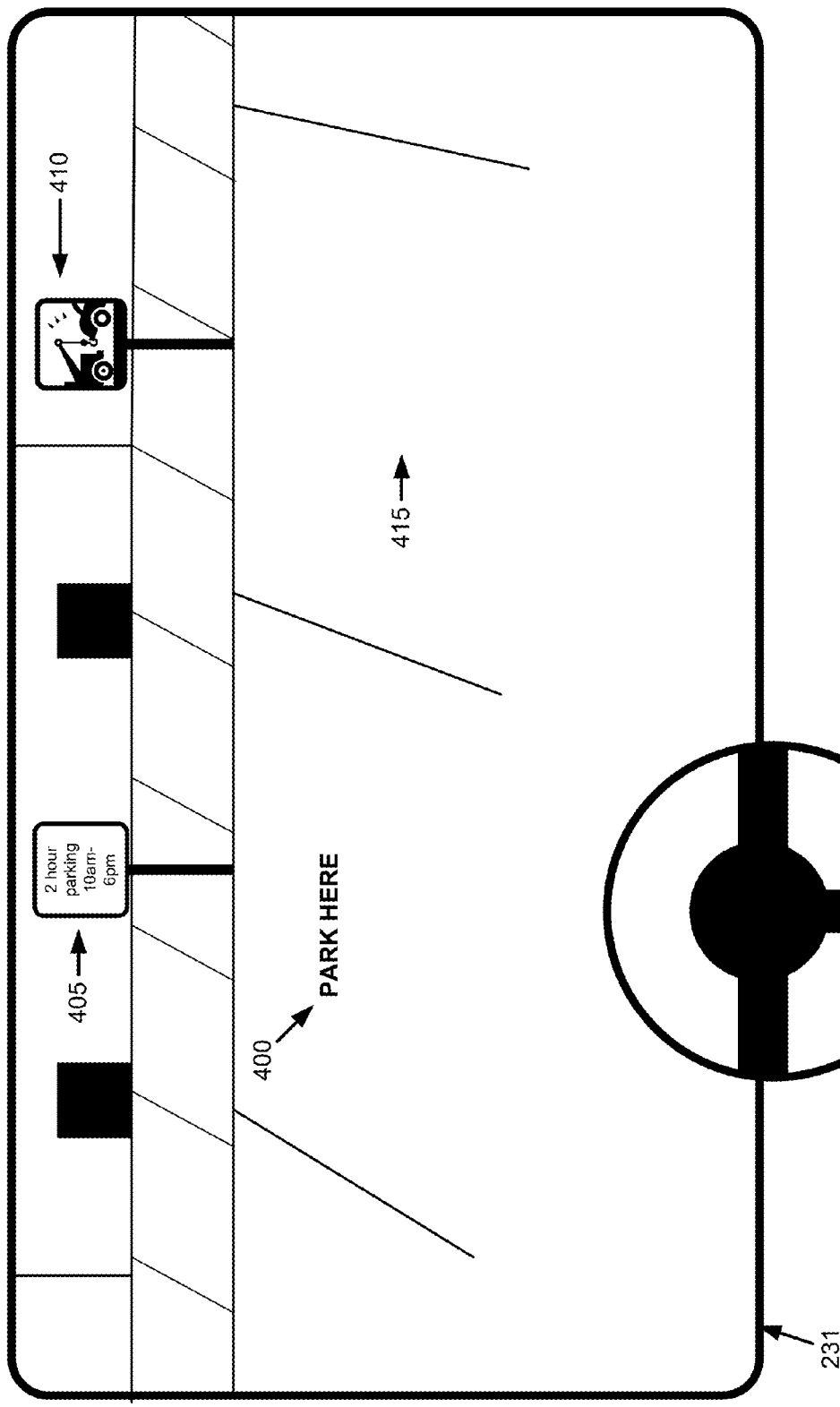

In yet another example, if the object is a parking space but it is currently illegal for the driver 125 to park the vehicle 103 in the parking space because of the time of day or the presence of a tow away zone, then the relevance module 208 may determine that the object is not relevant to the driver 125 (see, e.g., FIG. 4 where there are two parking spaces, but one is a tow away zone but the other is not, and so, the other is determined by the relevance module 208 to be relevant to the driver 125).

The relevance module 208 can be software including routines for causing the processor 225 to determine which of the available voice commands described by the voice command data 296 are relevant to the object and the driver 125 given the object identity. This processor may be described as "selecting a voice command."

For example, if the object is a business, then the relevance module 208 may determine that a voice command for increasing the radio volume is not relevant to the object or the driver 125. However, the relevance module 208 may determine that a voice command for calling the business is relevant. The relevance module 208 may determine that another relevant voice command would be requesting information about the business. The information about the business may be described by the operation information included in the directory data 131.

In some implementations, the relevance module 208 may repeat this operation for each of the objects identified by the analysis module 206 as being viewable in the 3D HUD 231.

In some implementations, the relevance module 208 can be stored in the memory 227 of the computer system 200 and can be accessible and executable by the processor 225.

The display module 210 can be software including routines for causing the 3D HUD 231 to display a 3D overlay based on the 3D overlay data 297. The display module 210 may generate the 3D overlay data 297 based on the voice command selected by the relevance module 208. For example, if the voice command selected by the relevance module 208 includes "getting information about a business" then the display module 210 may generate 3D overlay data 297 configured to cause the 3D HUD 231 to display one or more of the 3D overlays 300, 305, 310 depicted in FIG. 3. The display module 210 may then cause the 3D HUD 231 to display the 3D overlay. If the driver 125 then says "Get info" or some similar voice command, then the display module 210 may generate 3D overlay data 297 based on the operation information for the business that describes some or all of the operation information for the business. The display module 210 may then cause the 3D HUD 231 to display the 3D overlay describing the operation information for the business (e.g., what the hours of operation are for the business, when the business will next be open, whether the business is presently open, the goods or services provided by the business, reviews for the business, the price range for the business, images of the inside of the business, the phone number for the business, how long the business has been in operation, etc.).

Optionally, the 3D overlay data 297 may include data for displaying an animated 3D overlay. The animation may be configured to be subtle so that the driver 125 is not distracted.

In some implementations, the display module 210 can be software for causing the processor 225 to paint the 3D overlay on the 3D HUD 231 in proximity to the object by transforming the sensor coordinates of the object to driver's point of view coordinates so that the driver 125 knows which voice commands are available for the object. See, for example, the description of FIG. 2B below or the description of the "3D superposition display technology" above.

In some implementations, the display module 210 may be software for causing the processor 225 to proactively determine if the 3D overlay will be distracting to the driver 125 or cause a safety risk and selectively not paint certain graphics if they will cause a safety risk. For example, if two 3D overlays are to be painted, but one graphic will obscure the driver's view of oncoming traffic but the other graphic will not, then the display module 210 will only cause the processor 225 to paint the 3D overlay that does not obscure the driver's view of traffic.

In some implementations, the display module 210 can be stored in the memory 227 of the computer system 200 and can be accessible and executable by the processor 225.

The command module 212 can be software including routines for causing the processor to listen for the driver 125 to provide a voice command and take action based on the voice command. For example, the command module 212 may cause the voice command system 247 to take action based on the voice command. In another example, the command module 212 may cause the display module 210 to paint a particular 3D overlay on the 3D HUD 231 responsive to the voice command. The sensor set 233 may include a microphone for listening for the voice command.

In some implementations, the command module 212 can be stored in the memory 227 of the computer system 200 and can be accessible and executable by the processor 225.

Figure 2B:
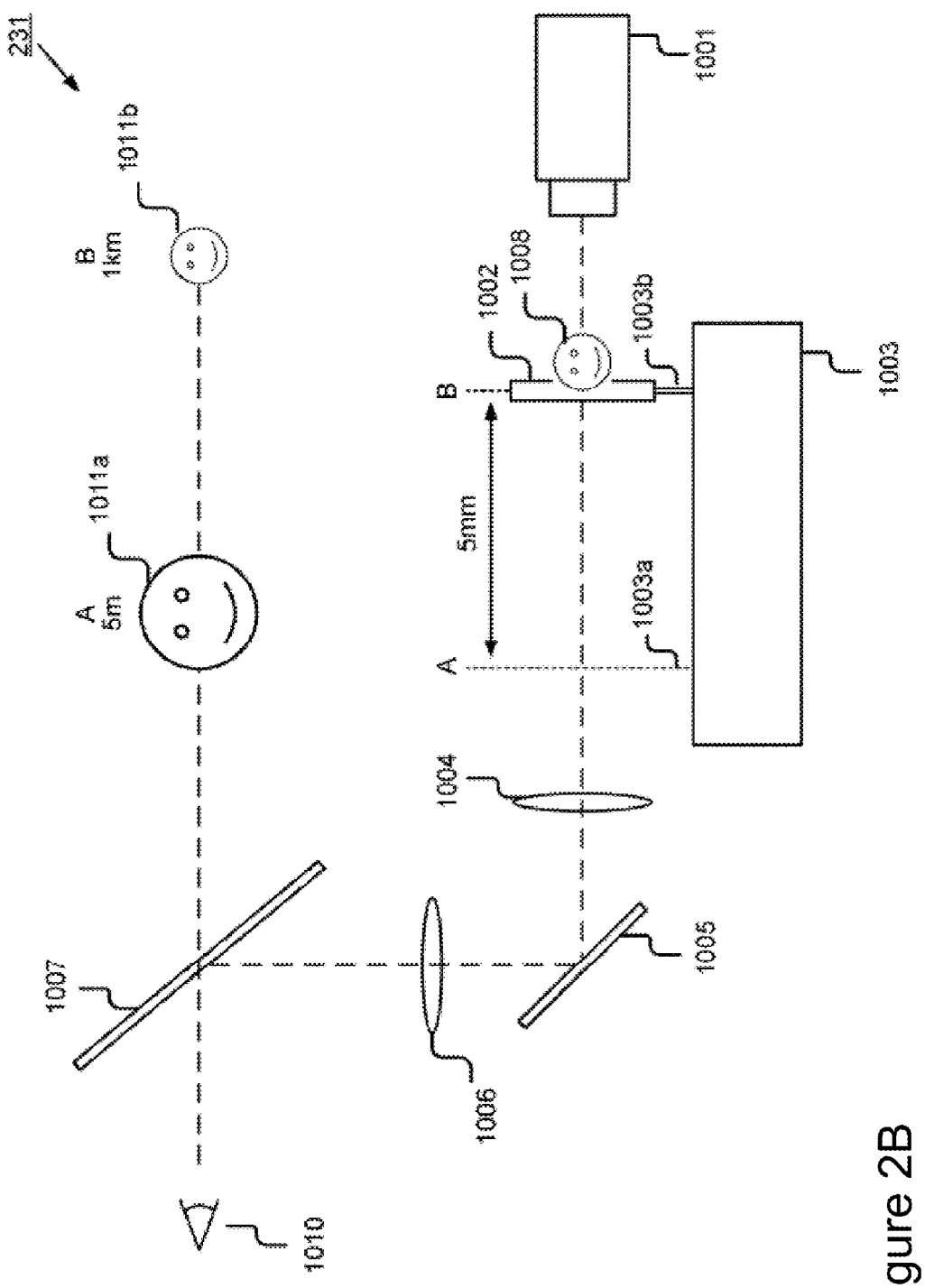
FIG. 2B is a block diagram illustrating an 3D HUD according to some implementations.

Referring to FIG. 2B, depicted is a block diagram illustrating an 3D HUD 231 according to some implementations.

In some implementations, the 3D HUD 231 includes a projector 1001, a movable screen 1002, a screen-driving unit 1003, an optical system (including lenses 1004, 1006, reflector 1005, etc.). The projector 1001 may be any kind of projector such as a digital mirror device ("DMD") project, a liquid crystal projector. The projector 1001 projects an image (graphic) 1008 on the movable screen 1002. The movable screen 1002 includes a transparent plate and so the projected image lights transmit through the movable screen 1002 to be projected on the windshield 1007 of a vehicle 103. The image projected on the windshield 1007 is perceived by a driver 1010 as if it is a real object (shown as 1011a, 1011b) that exists in the three-dimensional space of the real world, as opposed to an object that is projected on the windshield.

In some implementations, the 3D HUD 231 is capable of controlling the direction of the image relative to the driver 1010 (in other words, the image position in the windshield) by adjusting the projection position on the screen 1002. Further the screen 1002 is movable by the screen-driving unit 1003 in the range between the positions 1003a and 1003b. Adjusting the position of the screen 1002 can vary the depth (distance) of the projected image from the driver 1010 in the real world. In one example, the movable range of the screen 1002 (distance between positions 1003a and 1003b) may be 5 mm, which correspond to from 5 m away to infinity in the real world. The use of the 3D HUD 231 allows the driver 1010 to perceive the projected image exist in the real world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D HUD 231 depicted in FIG. 2B is provided by way of example. Other examples are possible. These examples may include heads-up displays having more or less complexity than the 3D HUD 231 depicted in FIG. 2B. For example, it is anticipated that in the future there will be heads-up displays that do not require movable parts such as the movable screen 1002. For example, a static screen that does not move may be deployed. The heads-up display deployed may not be a two-dimensional heads-up display unit. The visual context application 199 described above with reference to FIG. 2A is designed to be operable with such components.

Example 3D Overlays

FIGS. 3 through 6 are graphic representations of example 3D overlays displayed in a 3D HUD 231 according to some implementations.

Figure 3:
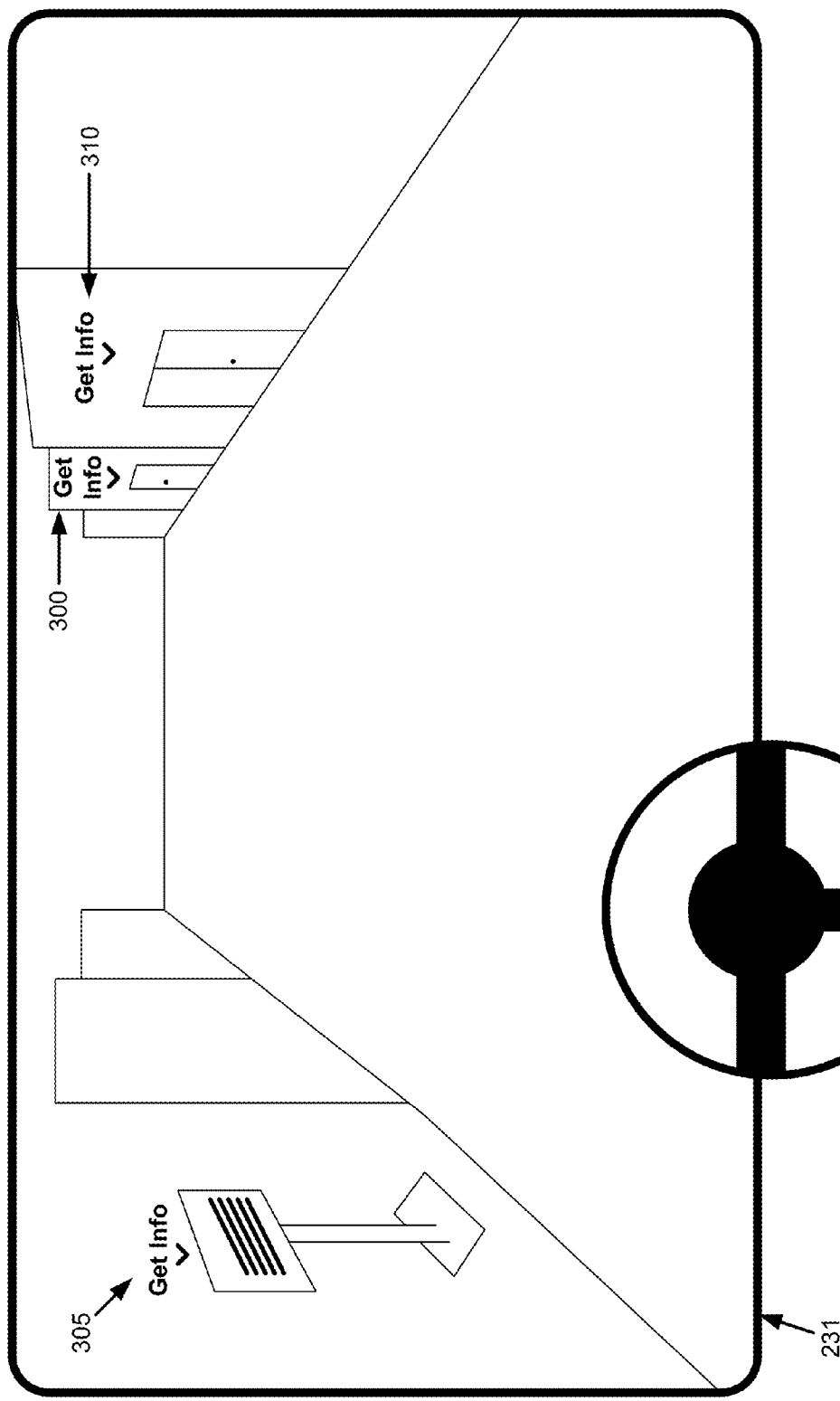
FIGS. 3 through 6 are graphic representations of example 3D overlays displayed in a 3D HUD according to some implementations.

Referring to FIG. 3, depicted is a graphic representation of three example 3D overlays 300, 305, 310 displayed in a 3D HUD 231 according to some implementations.

A first 3D overlay 300 and a second 3D overlay 310 are associated with businesses. In some implementations, the driver 125 may say "get info" and the speakers of the vehicle will provide audio describing the operation information for the business. Optionally, the driver says "get info" and the 3D HUD 231 displays operation information about one or more of the businesses on the 3D HUD 231 as another 3D overlay.

In some implementations, the visual context application 199 may determine which of the 3D overlays the driver 125 is looking at in order to determine which set of operation information to provide to the driver 125 (e.g., the business associated with the first 3D overlay 300 or the business associated with the second 3D overlay 310).

Accordingly, the visual context application 199 may assist the driver 125 to discover which voice commands are available to them. The visual context application 199 may also filter the available voice commands and only present those voice commands that are relevant to the driver 125 or the vehicle environment 198.

A third 3D overlay 305 is associated with a sign. The sign may be a parking sign, a traffic management sign, a commercial sign for a business, etc. In some implementations, the driver 125 may say "get info" and the speakers of the vehicle will provide audio describing the content of the sign. Optionally, the driver says "get info" and the 3D HUD 231 displays content of the sign on the 3D HUD 231 as another 3D overlay. The content of the sign may be captured by the exterior camera 104 or determined based on object priors that indicate the content of the sign. Accordingly, the visual context application 199 may assist the driver to identify new destinations.

Referring to FIG. 4, depicted is a graphic representation of an example fourth 3D overlay 400 displayed in a 3D HUD 231 according to some implementations.

The fourth 3D overlay 400 is associated with a first parking space that is legal for the driver 125 given the present time of day. Element 415 indicates a second parking space that is not legal because it is present in a tow away zone as indicated by the second parking sign 410.

The first parking space also includes a first parking sign 405. The visual context application 199 may perform one or more of the following operations: identify the first parking space in an image captured by the exterior camera 104; identify the first parking sign 405 associated with the first parking space in the image captured by the exterior camera 104; determine the rule indicated by the first parking sign 405 based on one or more object priors; determine that it is legal to park in the first parking space based on the present time of day and the rule indicated by the first parking sign; determine that the first parking space is relevant to the driver 125 since it is legal to park there; select a voice command for engaging an automatic parking system of the vehicle 103 to cause the vehicle 103 to automatically park in the first parking space; select a 3D overlay indicating that the driver 125 may provide a voice command to cause the vehicle 103 to automatically park in the first parking space; paint the fourth 3D overlay 400 on the 3D HUD 231; identify the second parking space 415 in an image captured by the exterior camera 104; identify the second parking sign 410 associated with the second parking space 415 in the image captured by the exterior camera 104; determine the rule indicated by the second parking sign 410 based on one or more object priors; determine that it is illegal to park in the second parking space 415 based on the rule indicated by the second parking sign 410; determine that the first parking space is not relevant to the driver 125 since it is illegal to park there; and determine to not paint a 3D overlay for the second parking space because it is not relevant and there are no relevant voice commands for the second parking space.

Figure 5:
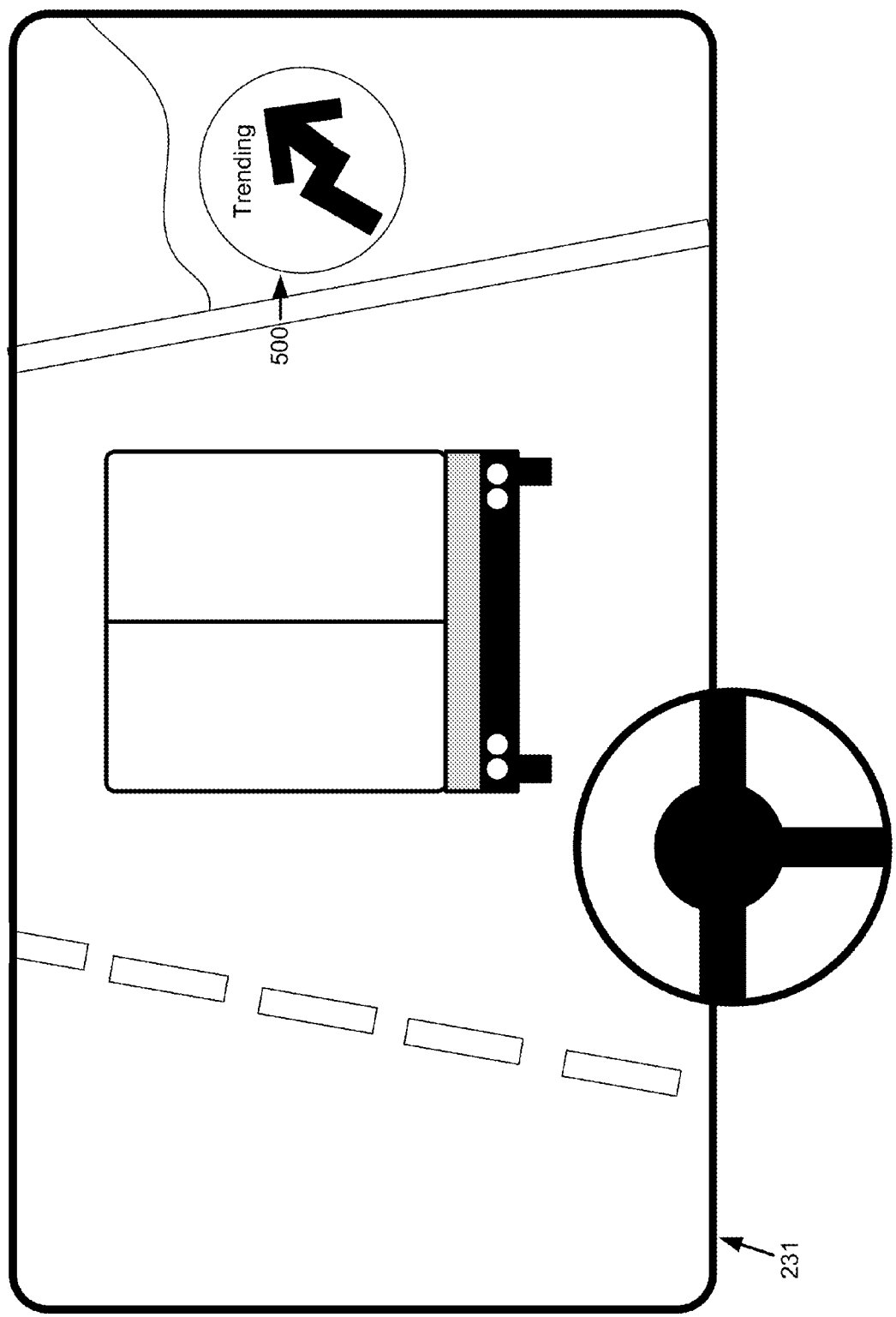

Referring to FIG. 5, depicted is a graphic representation of an example fifth 3D overlay 500 displayed in a 3D HUD 231 according to some implementations.

The social network application 111 may identify a trending destination. The destination may be trending associations of the driver 125 or among drivers in general. The visual context application 199 may identify a road that leads to the trending destination paint a 3D overlay on the 3D HUD 231 that informs the driver 125 of this trend. The fifth 3D overlay 500 is associated with the road that leads to the trending destination.

In some implementations, the fifth 3D overlay maybe purely informative and not associated with a voice command.

In some implementations, the vehicle 103 may be an automated vehicle and the fifth 3D overlay may be associated with a voice command to cause the vehicle 103 to turn onto the road leading to the trending destination.

Figure 6:
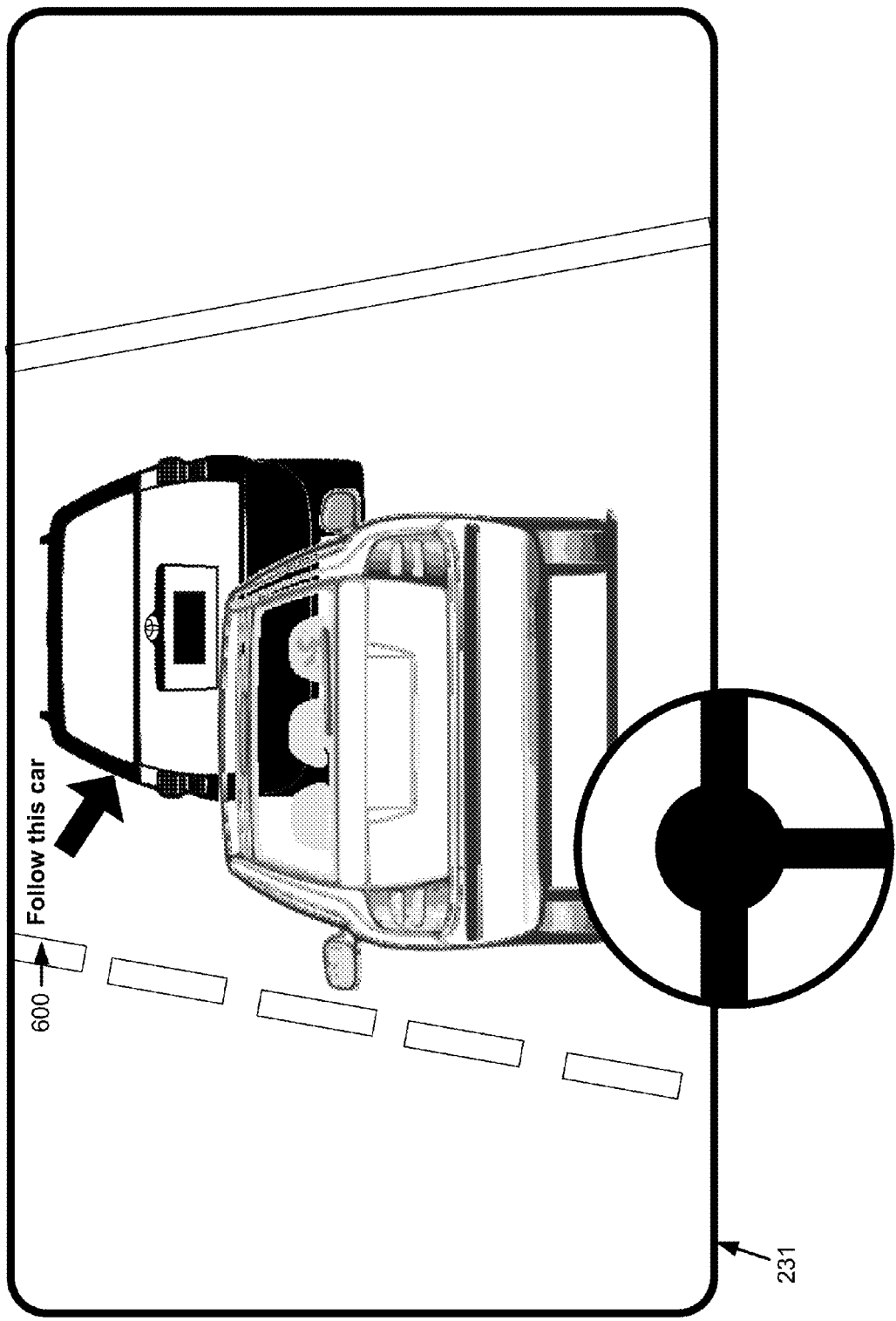

Referring to FIG. 6, depicted is a graphic representation of an example sixth 3D overlay 600 displayed in a 3D HUD 231 according to some implementations.

The object identified by the visual context application 199 may not necessarily be a business. For example, the object may be other vehicles. In some implementations, the voice command data 296 may include a voice command for following a vehicle included in the 3D HUD 231 and the visual context application 199 may give options on which vehicle to follow. The driver 125 may say "follow vehicle X" and the visual context application 199 will provide a 3D overlay that assist the driver 125 to follow the vehicle or, if the vehicle 103 is an automated vehicle, cause the automated vehicle 103 to follow the identified vehicle associated with the sixth 3D overlay 600.

For example, assume that two vehicles (Vehicle A and Vehicle B) are driving to the same destination. The driver of Vehicle A may be familiar with the best route to take to get to the destination. The driver of Vehicle B may configure the 3D HUD 231 of Vehicle B so that the 3D HUD 231 makes it easier for the driver to follow Vehicle A. For example, Vehicle A may appear differently in the 3D HUD 231 of Vehicle B so that the driver of Vehicle B may easily follow Vehicle A.

Methods

Figure 7A:
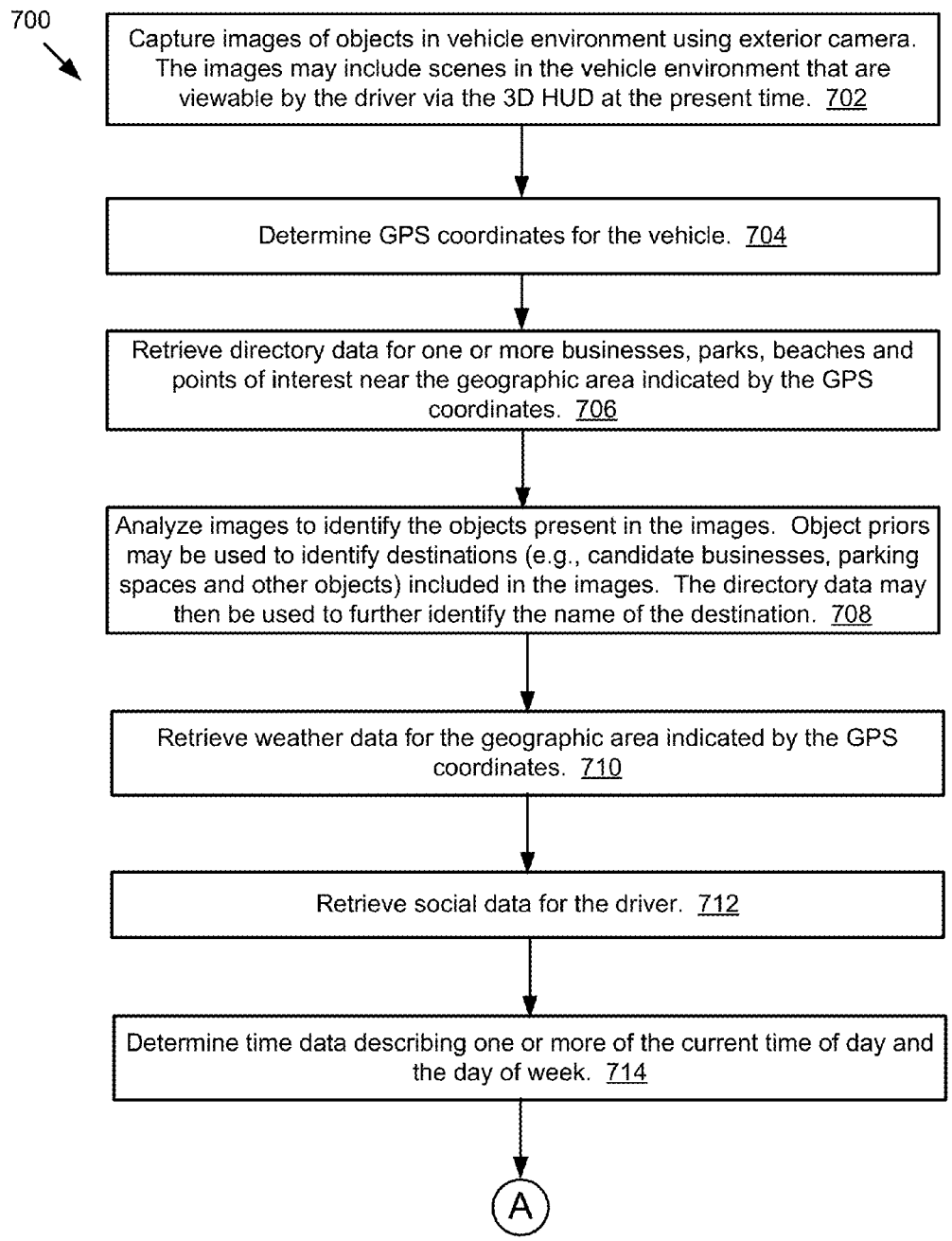
FIGS. 7A and 7B are a flowchart of an example method for displaying a 3D overlay in a 3D HUD to provide visual context for a voice command according to some implementations.
Figure 7B:
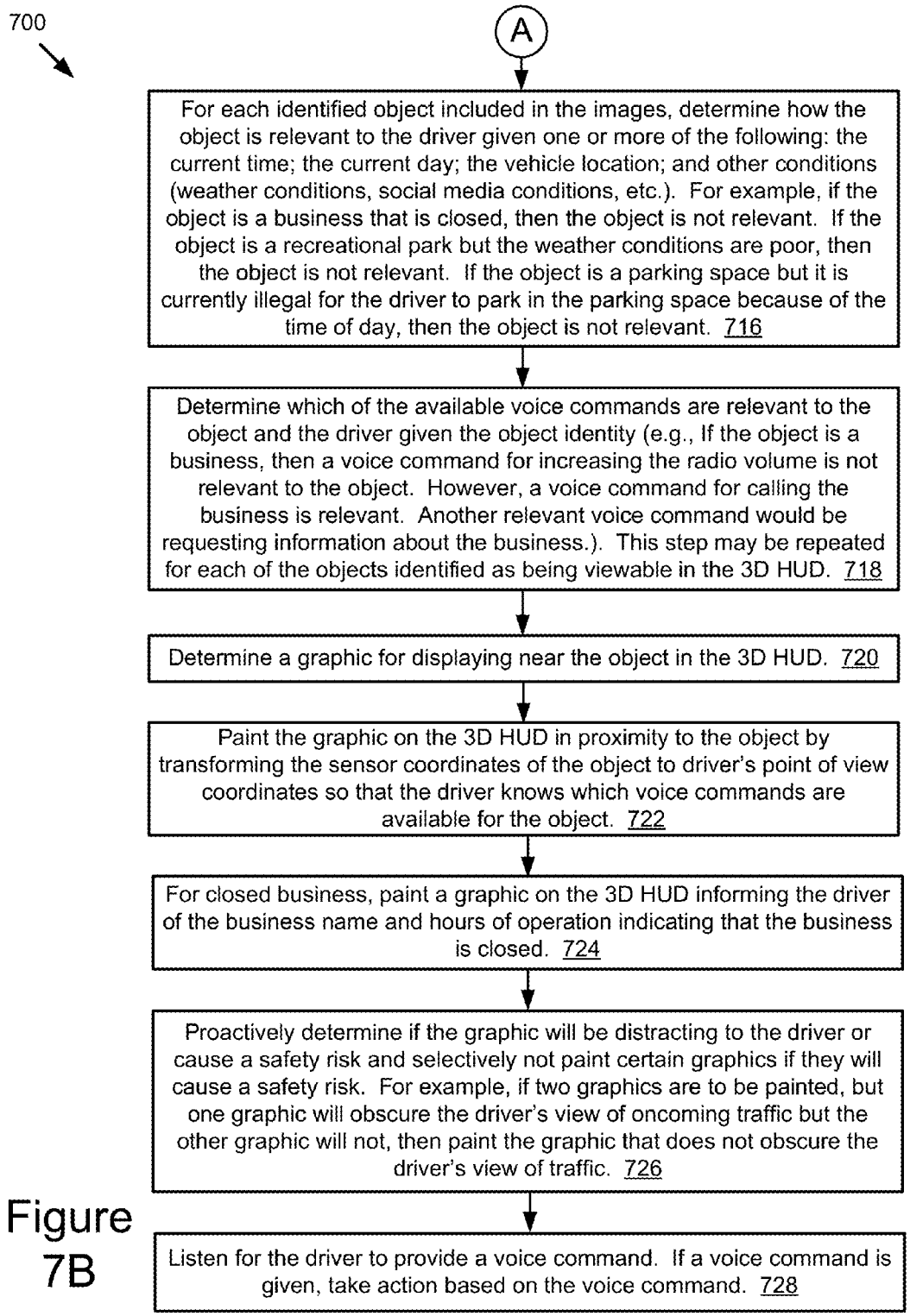

FIGS. 7A and 7B are a flowchart of an example method 700 for displaying a 3D overlay in a 3D HUD to provide visual context for a voice command according to some implementations. In some implementations, the visual context application 199 may include code and routines configured to cause the processor 225 to execute one or more steps of the method 700 upon being executed by the processor 225.

A vehicle environment may include the area around a vehicle. The vehicle environment may include one or more of the following: the vehicle itself; other vehicles; one or more businesses; one or more public parking spaces; one or more parking lots; one or more recreational areas (parks, beaches, trails); one or more emergency services (hospital, police, etc.); one or more points of interest (tourist destinations, landmarks, trending locations, locations where their friends are located), etc.

The vehicle may include an exterior camera mounted to the vehicle to capture images of scenes present in the vehicle environment. The exterior camera may be communicatively coupled to the visual context application. The visual context application may be operable to control the operation of the exterior camera.

In some implementations, at step 702 the visual context application may operate the camera to cause the camera to capture one or more images of objects in the vehicle environment. The images may include scenes in the vehicle environment that are viewable by the driver via the 3D HUD at the present time.

The vehicle may include a global positioning system ("GPS") unit. The visual context application may be communicative coupled to the GPS unit. The visual context application may be operable to control the operation of the GPS unit. The GPS unit may be a DSRC-compliant GPS unit.

In some implementations, at step 704 the visual context application may determine GPS coordinates for the vehicle.

The vehicle may include a communication unit. The communication unit may be communicatively coupled to a network. The communication unit may retrieve or otherwise receive data from one or more services via the network. The services may include a social network service, a directory service, a map service and a weather service. The social network service may provide one or more social networks. The directory service may provide data describing one or more destinations (e.g., businesses, recreational areas, points of interest, landmarks, etc.). The weather service may provide information describing the present weather or a weather forecast.

In some implementations, at step 706 the visual context application may retrieve directory data for one or more businesses, parks, beaches and points of interest near the geographic area indicated by the GPS coordinates.

In some implementations, at step 708 the visual context application may analyze the one or more images to identify the objects present in the images. The visual context may use object priors to identify destinations (e.g., candidate businesses, parking spaces and other objects) included in the images. The directory data may then be used to further identify the name of the destination.

In some implementations, at step 710 the visual context application may retrieve weather data for the geographic area indicated by the GPS coordinates.

In some implementations, at step 712 the visual context application may retrieve social data for the driver.

In some implementations, at step 714 the visual context application may determine time data describing the current time of day and the day of week.

Referring now to FIG. 7B. In some implementations, for each identified object included in the images, at step 716 the visual context application may determine how the object is relevant to the driver given one or more of the following: the current time; the current day; the vehicle location; and other conditions (weather conditions, social media conditions, etc.). For example, if the object is a business that is closed, then the object is not relevant. If the object is a recreational park but the weather conditions are poor, then the object is not relevant. If the object is a parking space but it is currently illegal for the driver to park in the parking space because of the time of day, then the object is not relevant.

The vehicle may include a voice command system. The voice command system may include a set of voice commands. The voice command system may be operable to control one or more vehicle functions based on receipt of a voice command. For example, if the driver says "park in the parking space," then the voice command system may be operable to cause automated parking system of the vehicle to park in the target parking space.

In above example, the voice command was relevant to the target of the voice command (i.e., the target of the voice command is the parking space). However, the voice command system includes other voice commands that are not relevant to the target. For example, the voice command system may include a voice command such as "turn up the volume of the radio" that is not relevant to a target that includes a parking space.

In some implementations, at step 718 the visual context application may determine which of the available voice commands are relevant to the identified object in the image and the driver given the object identity (e.g., If the object is a business, then a voice command for increasing the radio volume is not relevant to the object. However, a voice command for calling the business is relevant. Another relevant voice command would be requesting information about the business.). This step may be repeated for each of the objects identified as being viewable in the 3D HUD.

In some implementations, at step 720 the visual context application may determine a graphic for displaying near the object in the 3D HUD. The graphic may include an overlay. The overlay may be a 3D overlay. The graphic may be animated in some implementations.

In some implementations, at step 722 the visual context application may paint the graphic on the 3D HUD in proximity to the object by transforming the sensor coordinates of the object to driver's point of view coordinates so that the driver knows which voice commands are available for the object.

In some implementations, for closed business, at step 724 the visual context application may paint a graphic on the 3D HUD informing the driver of the business name and hours of operation indicating that the business is closed.

In some implementations, at step 726 the visual context application may proactively determine if the graphic will be distracting to the user or cause a safety risk and selectively not paint certain graphics if they will cause a safety risk. For example, if two graphics are to be painted, but one graphic will obscure the driver's view of oncoming traffic but the other graphic will not, then paint the graphic that does not obscure the driver's view of traffic.

In some implementations, at step 728 the visual context application may listen for the driver to provide a voice command. If a voice command is given, the visual context application take action based on the voice command. For example, the visual context application may be operable to cause the voice command system to take action that fulfills the voice command.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A computer-implemented method comprising:
capturing an image of an object in a vehicle environment, wherein the image includes a scene in the vehicle environment that is viewable by a driver when looking through a three dimensional heads-up display unit ("3D HUD") included in a vehicle that is driven by the driver;
receiving GPS data describing a geographic location of the vehicle;
receiving directory data describing one or more destinations proximate to the geographic location of the vehicle and operation information for the one or more destinations;
determining an identity of the object, sensor coordinates of the object, and a rule indicated by the object based at least in part on a set of object priors including images of the one or more destinations;
determining time data describing a current time;
determining a relevance of the object to the driver based on the time data, the rule, and the operation information, wherein the current time and the rule indicate that the object is relevant to the driver;
selecting a voice command that is relevant to the object and the driver based on the identity of the object and the relevance of the object to the driver, wherein upon receipt of the voice command from the driver, a voice command system controls one or more vehicle functions that correspond to the voice command;
identifying three dimensional overlay data ("3D overlay data") associated with the object based on the relevance of the object to the driver, wherein the 3D overlay data describes the voice command; and
painting a 3D overlay described by the 3D overlay data at a first location in the 3D HUD by transforming the sensor coordinates of the object to point of view coordinates of the driver which are operable to cause the 3D overlay to be painted on the 3D HUD in a proximity to the object as viewed by the driver through the 3D HUD so that the driver can discern from the proximity which voice commands are available for the object.

2. A computer-implemented method comprising:
capturing an image of an object in a vehicle environment, wherein the image includes a scene in the vehicle environment that is viewable by a driver when looking through a through a 3D HUD included in a vehicle that is driven by the driver;
receiving GPS data describing a geographic location of the vehicle;
receiving directory data describing one or more destinations proximate to the geographic location of the vehicle and operation information for the one or more destinations;
determining an identity of the object, sensor coordinates of the object, and a rule indicated by the object;
determining time data describing a current time;
determining that the object is relevant to the driver based on the current time and the rule;
selecting a voice command that is relevant to the object based on the identity of the object, wherein upon receipt of the voice command from the driver, a voice command system controls one or more vehicle functions that correspond to the voice command;
identifying 3D overlay data associated with the object that describes the voice command; and
painting a 3D overlay described by the 3D overlay data at a first location in the 3D HUD by transforming the sensor coordinates of the object to point of view coordinates of the driver which are operable to cause the 3D overlay to be painted on the 3D HUD in a proximity to the object as viewed by the driver through the 3D HUD so that the driver can discern from the proximity which voice commands are available for the object, wherein the 3D overlay describes the voice command that is available to the driver and wherein the driver does not need to adjust eye focus in order to view the 3D overlay data.

3. The method of claim 2, wherein the identity of the object is determined based at least in part on a set of object priors including images of the one or more destinations.

4. The method of claim 2, wherein the object is a parking sign and the rule describes times of day when it is legal to park in a parking space.

5. The method of claim 2, wherein the object is a business and the operation information describes hours of operation for the business.

6. The method of claim 5, wherein the operation information and the time data indicate that the one or more destinations are available at the current time.

7. The method of claim 6, wherein the selected voice command includes requesting information about the business and the 3D overlay includes a graphic indicating that the driver may request information about the business.

8. The method of claim 5, further comprising:
retrieving social data for the driver;
wherein determining that the object is relevant is further based on the social data.

9. The method of claim 8, wherein the selected voice command includes calling the business and the 3D overlay includes a graphic indicating that the driver may request that a phone call be made to the business.

10. The method of claim 8, wherein the selected voice command includes requesting information about the business and the 3D overlay includes a graphic indicating that the driver may request information about the business.

11. The method of claim 2, further comprising determining weather data describing a weather forecast for the geographic location.

12. The method of claim 11, wherein the object is an outdoor facility.

13. The method of claim 12, wherein the weather forecast indicates weather that is inconsistent with the operation information for the outdoor facility.

14. The method of claim 13, wherein the selected voice command includes requesting information about the outdoor facility and the 3D overlay includes a graphic indicating that the driver may request information about the outdoor facility.

15. The method of claim 12, wherein the weather forecast indicates weather that is consistent with the operation information.

16. The method of claim 15, the selected voice command includes requesting the weather forecast and the 3D overlay includes a graphic indicating that the driver may request the weather forecast.

17. The method of claim 12, wherein the outdoor facility is a park.

18. The method of claim 17, wherein the operation information describes one or more rules for the park, the selected voice command includes requesting the rules for the park and the 3D overlay includes a graphic indicating that the driver may request the rules for the park.

19. The method of claim 2, wherein the object is a parking space, the selected voice command includes requesting the vehicle automatically park in the parking space and the 3D overlay includes a graphic indicating that the driver may request that the vehicle automatically park in the parking space.

20. A computer-implemented method comprising:
- capturing an image of a parking space and a parking sign associated with the parking space, wherein the parking space is viewable by a driver when looking through a through a 3D HUD included in a vehicle that is driven by the driver;
- determining sensor coordinates of the parking sign and an identity of the parking sign based at least in part on a set of object priors including images a set of parking signs;
- determining a present time;
- determining a rule associated with the parking sign based on the identity of the parking sign, wherein applicability of the rule varies based on the present time;
- determining whether the vehicle can legally park in the parking space based on the rule associated with the parking sign and the present time;
- selecting a voice command that is relevant to the parking space based on the rule associated with the parking sign, wherein upon receipt of the voice command from the driver, a voice command system controls one or more vehicle functions that correspond to the voice command;
- determining 3D overlay data describing whether the vehicle can legally park in the parking space, wherein the 3D overlay data describes the voice command; and
- painting a 3D overlay described by the 3D overlay data at a first location in the 3D HUD by transforming the sensor coordinates of the parking sign to point of view coordinates of the driver which are operable to cause the 3D overlay to be painted on the 3D HUD in a proximity to the parking sign as viewed by the driver through the 3D HUD so that the driver can discern from the proximity which voice commands are available for the parking sign.

21. The method of claim 20, wherein the voice command is for engaging an automatic parking system of the vehicle to cause the vehicle to automatically park in the parking space.

* * * * *